(12) United States Patent
Wieduwilt et al.

(10) Patent No.: US 9,452,855 B2
(45) Date of Patent: Sep. 27, 2016

(54) SEPARATING TOOL OF A JOINING DEVICE FOR FLEXIBLE PACKAGINGS

(71) Applicant: Robert Bosch GmbH, Stuttgart (DE)

(72) Inventors: Ulrich Wieduwilt, Schwaebisch Gmuend (DE); Juergen Ippers, Grefrath (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/901,213

(22) PCT Filed: Jun. 11, 2014

(86) PCT No.: PCT/EP2014/062149
§ 371 (c)(1),
(2) Date: Dec. 28, 2015

(87) PCT Pub. No.: WO2014/206738
PCT Pub. Date: Dec. 31, 2014

(65) Prior Publication Data
US 2016/0144989 A1     May 26, 2016

(30) Foreign Application Priority Data
Jun. 28, 2013 (DE) ........................ 10 2013 212 722

(51) Int. Cl.
*B32B 37/00* (2006.01)
*B65B 61/08* (2006.01)
(Continued)

(52) U.S. Cl.
CPC ................ *B65B 61/08* (2013.01); *B26D 1/62* (2013.01); *B26D 7/086* (2013.01); *B26D 7/2614* (2013.01); *B29C 65/087* (2013.01); *B29C 65/7443* (2013.01); *B29C 66/1122* (2013.01); *B29C 66/4312* (2013.01); *B29C 66/8167* (2013.01); *B29C 66/81417* (2013.01); *B29C 66/81429* (2013.01); *B29C 66/81463* (2013.01); *B29C 66/83513* (2013.01); *B29C 66/849* (2013.01);
(Continued)

(58) Field of Classification Search
CPC . B65B 61/08; B29C 65/087; B29C 65/7443; B29C 66/81463; B29C 66/83513; B29C 66/4312
USPC .................. 156/73.1, 250, 510, 580.1, 580.2
See application file for complete search history.

(56) References Cited

U.S. PATENT DOCUMENTS

| | | | |
|---|---|---|---|
| 3,384,528 A | 5/1968 | Lehmacher et al. | |
| 3,703,841 A | 11/1972 | Crawford | |

(Continued)

OTHER PUBLICATIONS

International Search Report for Application No. PCT/EP2014/062149 dated Sep. 26, 2014 (English Translation, 2 pages).

*Primary Examiner* — James Sells
(74) *Attorney, Agent, or Firm* — Michael Best & Friedrich LLP

(57) ABSTRACT

The invention relates to a separating tool of a joining device, in particular for tubular bag machines, comprising a blade carrier (1), which has a groove-like recess (2), in which a blade (3) is arranged, characterized in that at least part of a wall of the recess (2) is designed as a bending beam, which extends over the length of the blade (3) and is integrally connected to the blade carrier (1) and adjacent to the base region (4) of the recess (2), and that at least two clamping screws (7) are arranged on the blade carrier (1), which clamping screws preload the bending beam (5) in the direction of the blade (3) in order to clamp the blade and are supported in threaded recesses (6) of the blade carrier (1).

19 Claims, 3 Drawing Sheets

(51) Int. Cl.
*B65B 51/30* (2006.01)
*B29C 65/08* (2006.01)
*B29C 65/74* (2006.01)
*B29C 65/00* (2006.01)
*B26D 7/08* (2006.01)
*B26D 1/62* (2006.01)
*B26D 7/26* (2006.01)
*B65B 51/22* (2006.01)

(52) U.S. Cl.
CPC ............. *B65B 51/225* (2013.01); *B65B 51/30* (2013.01); *B29C 66/4322* (2013.01)

(56) References Cited

U.S. PATENT DOCUMENTS

| | | | | |
|---|---|---|---|---|
| 5,468,325 | A * | 11/1995 | Eckelt | A47G 25/36 156/212 |
| 2004/0094254 | A1* | 5/2004 | Lim | B29C 65/08 156/73.1 |
| 2013/0126084 | A1* | 5/2013 | Zieger | B25B 23/141 156/256 |

* cited by examiner

SEPARATING TOOL OF A JOINING DEVICE FOR FLEXIBLE PACKAGINGS

BACKGROUND OF THE INVENTION

The present invention relates to a separating tool of a joining device for flexible packagings, in particular for tubular bag machines in which a sealing operation takes place using ultrasound technology.

Horizontal tubular bag machines are known from the prior art, in which the packaging materials are joined to one another using conventional joining methods or alternative joining methods, such as, e.g., ultrasound, wherein a separating of the packaging is carried out in addition to the joining process. Thus, the packaging material tube is divided into individual tubular bags in the case of tubular bag packagings.

The separating process takes place between the upper roller and the lower roller when conventional rotary heat and cold sealing is performed.

For that reason, the cutting blades are usually fixed by means of end face or lateral clamping screws in the cutting gap of a joining tool.

Particularly in the case of ultrasonic sealing on horizontal tubular bag machines, ultrasonic frequencies have to be transmitted to passively oscillating components, such as, e.g., the cutting blades or crush cutters, when sealing the head or foot seam as well as during the cutting process. This coupling of the exciter frequency leads to natural frequencies along the free lengths between the clampings. Under the influence of the crushing or cutting force, said natural frequencies can lead to component failure. The service life of the blades is therefore not limited by wear to the blade geometry but rather by a component failure by means of blade breakage.

In addition cutting methods are known which use power-actuated cutoff or guillotine blades. In these methods the cutting force and the cutting speed are generated with the aid of pneumatics, hydraulics, crank drive, etc.

SUMMARY OF THE INVENTION

The present invention therefore relates to a separating tool of a joining device for flexible packagings, in particular for tubular bag machines, comprising a blade carrier, which has a groove-like recess, in which a blade is arranged. Provision is made according to the invention for at least part of a wall of the recess to be designed as a bending beam, which is integrally connected to the blade carrier and extends over the length of the blade and is adjacent to the base region of the recess, and for clamping screws to be arranged on the blade carrier, which are supported in threaded recesses of the blade carrier and preload the bending beam in the direction of the blade in order to clamp said blade. The present invention therefore provides that the clamping screws do not directly act on the blade but rather act against the bending beam, which in turn clamps the blade. This leads to a large-surface contacting between the blade and the bending beam. This results in a vibration decoupling (decoupling of the blade from the natural frequency of the ultrasonic sonotrode) which is considerably different from the prior art. The devices known from the prior art are known to use a multiplicity of clamping screws. These lead to a static redundancy and have the disadvantage that the screws can loosen as a result of being subjected to vibration, in particular as a result of the ultrasound used in the joining process. In contrast, it is possible according to the invention to achieve a reliable fixing of the blade with at least two clamping screws. The fixation principle according to the invention for cutting blades and crush cutters in rotary ultrasonic sealing devices eliminates the natural frequencies in the component which are generated by the exciter frequency. Depending on the number of sealing lugs, one or a plurality of cutting devices can be placed on a rotary ultrasound device. The invention enables the simple, wear-free cutting and separating of products, such as, e.g., tubular bags from a packaging material tube, which can be used in a rotary heat, cold or ultrasonic sealing process. The innovative fixation leads to a substantial increase in the service life of the cutting blades or crush cutters. The vibration dampening is independent of the exciter frequency, which, e.g., lies in the range from 20 to 40 KHz, because no natural vibrations, which can lead to component failure, occur due to the clamping of the component over the entire length thereof. In order to effectively reinforce the cutting blade or crush cutter, at least six clamping screws are required in the prior art at an exciter frequency of 30 KHz. A big advantage of the invention is that only two clamping screws are required to clamp the blade respectively cutter over the entire surface thereof, as is the case for a heat sealing method. The clamping screws do not require any additional screw retention because no natural frequencies occur in the component to be clamped. According to the invention, the cutting blade or crush cutter is thus clamped over the entire surface thereof by means of the bending beam so that no free lengths of the blade respectively cutter can be excited to vibrate in natural frequencies. The fixation of the cutting blade or crush cutter therefore occurs in a manner that is decoupled from vibration. Due to the design provided according to the invention, the natural frequencies are displaced into higher ranges with respect to the exciter frequency. The inventive solution provides a reinforcement of the entire separating tool structure, by means of which the natural frequencies are decoupled.

Provision is made in a preferred modification to the invention for the preferably at least two clamping screws to be spaced apart from one another and from the ends of the bending beam. As a result, the clamping screws can, with regard to the length of the blade or, respectively, the bending beam, uniformly configure the free lengths which are adjacent to the respective screw.

It is particularly favorable if the blade has substantially the same length as the blade carrier. The same applies to the bending beam. The blade thus contacts the bending beam and the blade carrier over the entire length thereof and is clamped by both of them and thus reliably retained.

A particularly advantageous use option for the blade carrier according to the invention occurs in a horizontal tubular bag machine comprising a rotatably movable cutting device. In so doing, a transverse sealing device comprising, for example, four sealing lugs can be provided, which device can be rotated about a horizontal axis and interacts with a mating gear which can likewise rotate about a horizontal axis.

Provision is made in a particularly favorable modification to the invention for the bending beam to be formed adjacent to the base region of the recess, in which the blade is accommodated, and to extend at least over a portion of the height of the groove-like recess. By means of such a configuration, a bending beam is provided which is sufficiently dimensioned in the height thereof and can be sufficiently deformed to clamp the blade. Provision is further made in a particularly favorable modification to the invention for the blade to abut against the walls of the recess on both sides in the lower region of the groove-like recesses. The blade is therefore firmly fitted within the recess and is additionally fixed by means of the clamping device with the aid of the bending beam and the clamping screws.

Provision is made in a further, particularly advantageous configuration of the invention for a gap surrounding the free region of the bending beam to be formed in the blade carrier. This gap can, for example, be produced by means of wire EDM. It is therefore possible to integrally form the bending beam with the blade carrier and at the same time ensure a pliability or deformability of the bending beam using the clamping screws.

In order to ensure an effective vibration decoupling, it is particularly advantageous if the blade is clamped in the blade carrier over the entire surface thereof. This prevents individual regions of the blade from being able to be set into natural vibrations.

According to the invention, the blade is clamped in the blade carrier so as to be decoupled from vibration. Depending on the frequency of the ultrasonic joining device, the blade can be consequently dimensioned and configured such that it is adapted to the tubular bag packagings to be produced, wherein an optimization of the entire sealing device with regard to the ultrasonic frequency takes place and the dimensioning of the blade then assumes a subordinate role.

Provision is made in a particularly favorable configuration of the invention for the joining device to be designed as an ultrasonic joining device. Other joining principles are, however, also possible, for example an excitation in another frequency range than in the usual ultrasonic frequency range.

BRIEF DESCRIPTION OF THE DRAWINGS

Exemplary embodiments of the invention are described below in detail with reference to the accompanying drawings. In the drawings.

DETAILED DESCRIPTION

Figure 1:
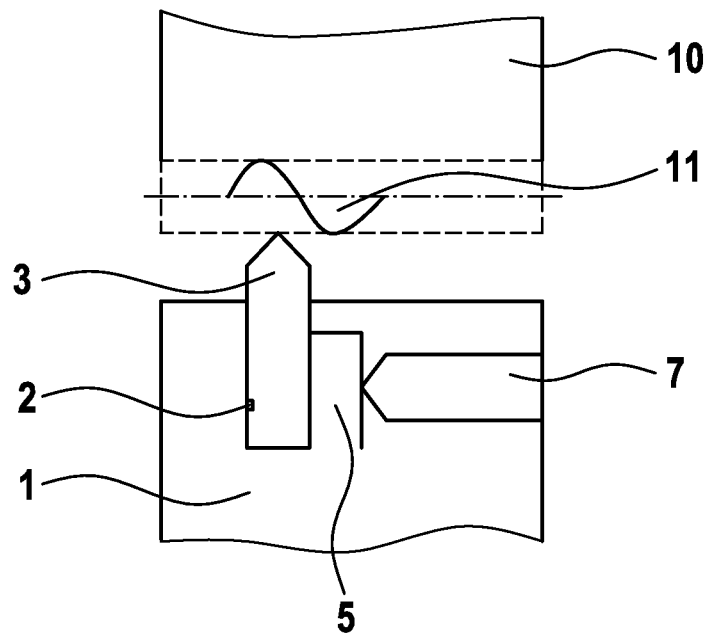
FIG. 1 shows a schematic lateral view of an exemplary embodiment of the separating tool according to the invention.

FIG. 1 shows a schematic lateral view of the separating tool according to the invention. Said separating tool comprises a blade carrier 1, in which a groove-like recess 2 is formed. A blade 3, which can be designed as a cutting blade or as a crush cutter, is arranged in the recess. It can be seen in the depiction of FIG. 1 that the blade 3 is accommodated in the groove-like recess 2 such that the lateral surfaces of said blade are entirely in direct contact with the recess 2.

One of the walls of the groove-like recess 2 is formed by a bending beam 5, which is integrally connected to the blade carrier 1 in the, with respect to the depiction of FIG. 1, lower region thereof. A clamping screw 7 is supported in the blade carrier 1 by means of a threaded recess 6 (see FIG. 3). By screwing in the clamping screw 7, said screw comes in contact with the bending beam 5 and deforms the same such that the blade 3 is subsequently clamped in the groove-like recess 2 of the blade carrier 1.

FIG. 1 further shows a sonotrode 10 in schematic depiction, which is disposed opposite the blade 3. An ultrasonic vibration 11 is further schematically depicted, which is used to join flexible packagings of a tubular bag machine, said packagings not being shown in detail.

Figure 2:
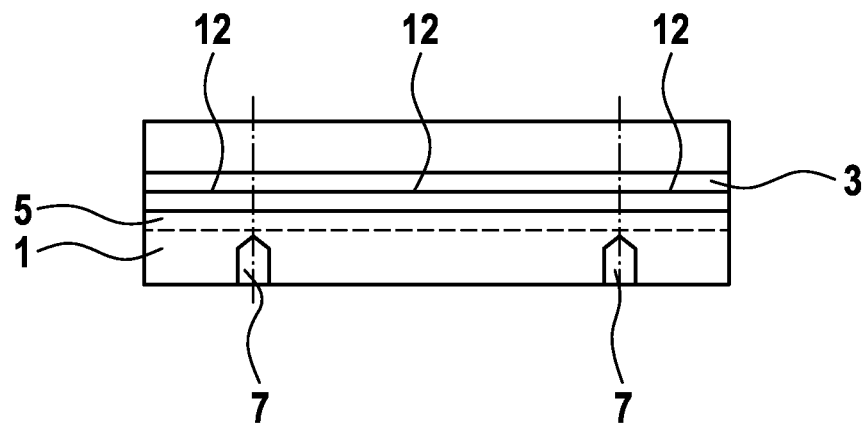
FIG. 2 shows a schematic view onto the longitudinal side of the arrangement depicted in FIG. 1.

FIG. 2 shows a lateral view of the arrangement depicted in FIG. 1. It can be seen here that two clamping screws 7 are provided in order to clamp the blade 3 by means of the bending beam 5. The reference sign 12 depicts the free lengths between the clamping screws 7.

Figure 3:
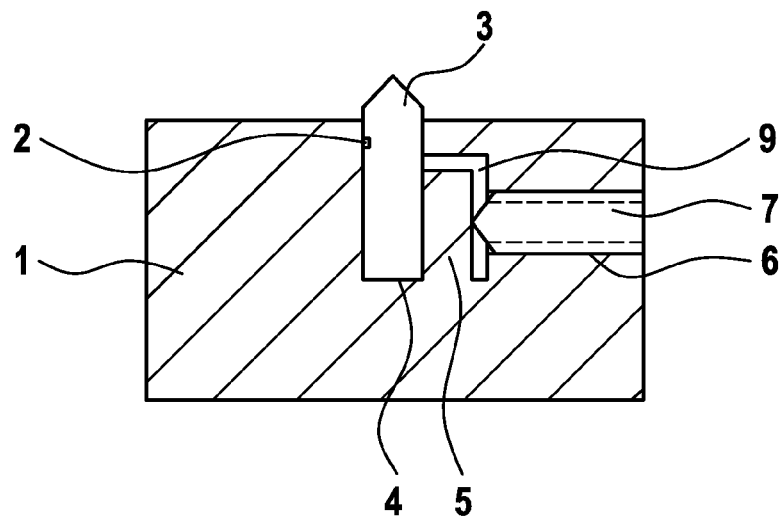
FIG. 3 shows a detailed view of an exemplary embodiment, analogous to FIG. 1.

FIG. 3 shows a detailed lateral view analogous to FIG. 1. It can especially be seen here that the bending beam 5 is integrally connected at the base region thereof to the blade carrier 1. The lateral and the upper flank of the bending beam 5 are delimited by a gap, which is, for example, produced by means of wire EDM. FIG. 3 further shows that the blade 3 abuts against the foot region 4 of the recess 2 and is thus situated in contact over its entire surface with the blade carrier 1. Especially a joint consideration of the FIGS. 2 and 3 highlights the fact that the bending beam 5 has substantially the same length as the blade carrier 1 and the blade 3.

Figure 4:
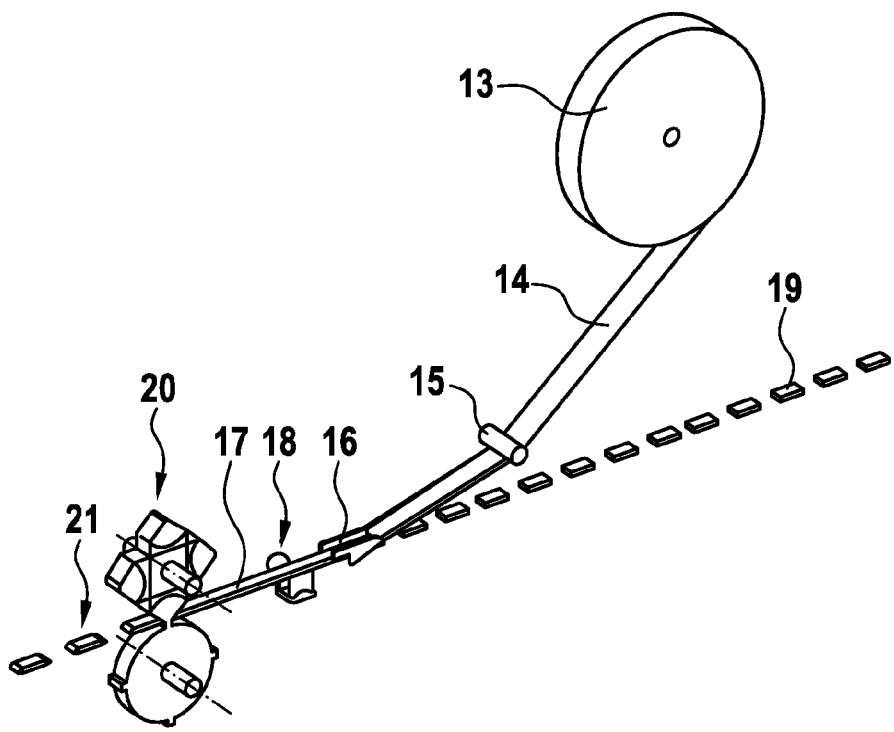
FIG. 4 shows a schematic depiction of the functionality and application of the separating tool according to the invention.

The functionality and application of the separating tool according to the invention for the longitudinal and transverse seam on a horizontal form-fill-seal (HFFS) machine is depicted in FIG. 4. A packaging material web 14 is led from a packaging material roll across a guide roller 15 and across a forming shoe 16 to a packaging material tube 17. A fin or overlap seam is subsequently formed with a longitudinal sealing device 18. The products 19 are, after said products have been fed from the product chain to the packaging material tube 17, further transported by means of friction between product and packaging material up to the transverse sealing point 20 comprising a separating function. The transverse sealing device 20 joins the two transverse sealing seams of the tubular bag and also carries out the separating function by means of a separating tool between sealing operations.

In this exemplary embodiment, the sonotrode can be directly fastened to the joint; however, any other fastening options at the sound conductor are possible. An anvil comprising energy directing means is not required to form the weld seam because the fusing of the sealing layers at the connection point takes place primarily by means of the heat spot. The invention can, however, also be used for conventional ultrasound.

Figure 5:
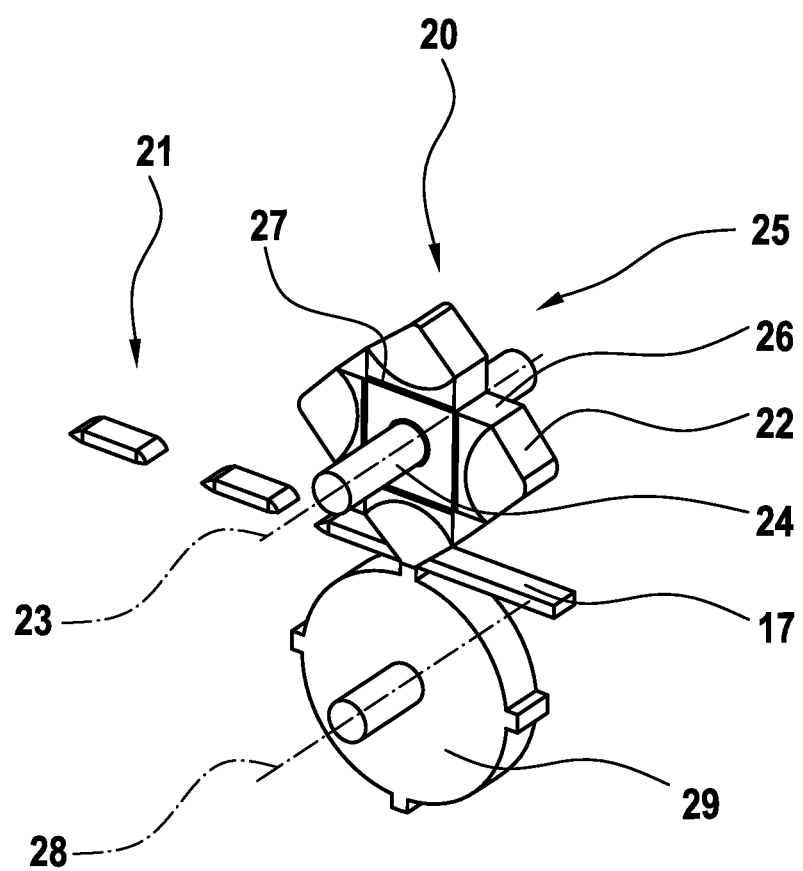
FIG. 5 shows a simplified perspective detailed view of the arrangement shown in FIG. 4.

The sealing device for transverse seams is depicted in detail in FIG. 5.

Four sealing lugs in the form of wedge-shaped sound conductors 22 are provided on a base shaft 24 which can be rotated about an axis 23 in the embodiment variant of the transverse sealing device 20 shown. The embodiment variants can vary from one to eight sealing lugs and also have an odd number of sound conductors. A fixation 25 of a focusing assembly 26 to the shaft 24 and to the sound conductor 22 can be a frictional or a positive-locking type of connection. The vibrations are converted from a sound generator/piezoceramics 27 via a focusing assembly 26 employing the sound conductor 22 into a heat line. This heat line generates the temperature input necessary for the sealing process into the joining materials. With the aid of a mating gear 29 that can be rotated about an axis 28 (rotary counter-holder device), the joining pressure necessary for the joining process is produced and the corresponding crushing or cutting force for the separating process is generated at the same time.

A packaging material tube comprising product 17 is fed to the sonotrode/counter-holder device 29 which rotates synchronously about an axis 28. The head seam of the leading tubular bag 21 is first formed. The separating function occurs thereafter, and the foot seam of the trailing tubular bag 21 is formed when the sealing lugs are rolled further.

The invention claimed is:

1. A separating tool of a joining device, comprising a blade carrier (1), which has a groove-like recess (2), in which a blade (3) is arranged, wherein at least part of a wall of the recess (2) is a bending beam, which is integrally connected to the blade carrier (1) and extends over the length of the blade (3) and is adjacent to the base region (4) of the recess (2), and wherein at least two clamping screws (7) are arranged on the blade carrier (1), which clamping screws preload the bending beam (5) in the direction of the blade (3) in order to clamp said blade and are supported in threaded recesses (6) of the blade carrier (1).

2. The separating tool according to claim 1, characterized in that the clamping screws (7) are spaced apart from one another and from the ends of the bending beam (5).

3. The separating tool according to claim 1, characterized in that the blade (3) has substantially a same length as the blade carrier (1).

4. The separating tool according to claim 1, characterized in that the blade carrier (1) is disposed on a rotatably movable cutting device (8).

5. The separating tool according to claim 1, characterized in that the bending beam (5) is formed adjacent to the base region (4) of the recess (2) and extends at least over a portion of a height of the groove-like recess (2).

6. The separating tool according to claim 1, characterized in that the blade (3) abuts against walls of the recess (3) on both sides in a lower region of the groove-like recess (2).

7. The separating tool according to claim 1, characterized in that a gap (9) surrounding a free region of the bending beam (5) is formed in the blade carrier (1).

8. The separating tool according to claim 1, characterized in that the blade (3) is clamped over an entire surface thereof in the blade carrier (1).

9. The separating tool according to claim 1, characterized in that the blade (3) is clamped in the blade carrier (1) so as to be decoupled from vibrations.

10. The separating tool according to claim 1, characterized in that the joining device is an ultrasonic joining device.

11. An ultrasonic joining device for a tubular bag machine, the joining device comprising a sonotrode and a blade carrier (1), the blade carrier having a groove-like recess (2) having therein a blade (3) disposed opposite the sonotrode, wherein at least part of a wall of the recess (2) is a bending beam, which is integrally connected to the blade carrier (1) and extends over the length of the blade (3) and is adjacent to the base region (4) of the recess (2), and wherein at least two clamping screws (7) are arranged on the blade carrier (1), which clamping screws preload the bending beam (5) in the direction of the blade (3) in order to clamp said blade and are supported in threaded recesses (6) of the blade carrier (1).

12. The joining device according to claim 11, characterized in that the clamping screws (7) are spaced apart from one another and from ends of the bending beam (5).

13. The joining device according to claim 11, characterized in that the blade (3) has substantially a same length as the blade carrier (1).

14. The joining device according to claim 11, characterized in that the blade carrier (1) is disposed on a rotatably movable cutting device (8).

15. The joining device according to claim 11, characterized in that the bending beam (5) is formed adjacent to the base region (4) of the recess (2) and extends at least over a portion of a height of the groove-like recess (2).

16. The joining device according to claim 11, characterized in that the blade (3) abuts against walls of the recess (3) on both sides in a lower region of the groove-like recess (2).

17. The joining device according to claim 11, characterized in that a gap (9) surrounding a free region of the bending beam (5) is formed in the blade carrier (1).

18. The joining device according to claim 11, characterized in that the blade (3) is clamped over an entire surface thereof in the blade carrier (1).

19. The joining device according to claim 11, characterized in that the blade (3) is clamped in the blade carrier (1) so as to be decoupled from vibrations.

* * * * *